Oct. 5, 1965 W. C. G. KOSTERS ETAL 3,210,269
DRY SOLVENT EXTRACTION OF HYDROCARBONS
Filed March 12, 1962 3 Sheets-Sheet 3
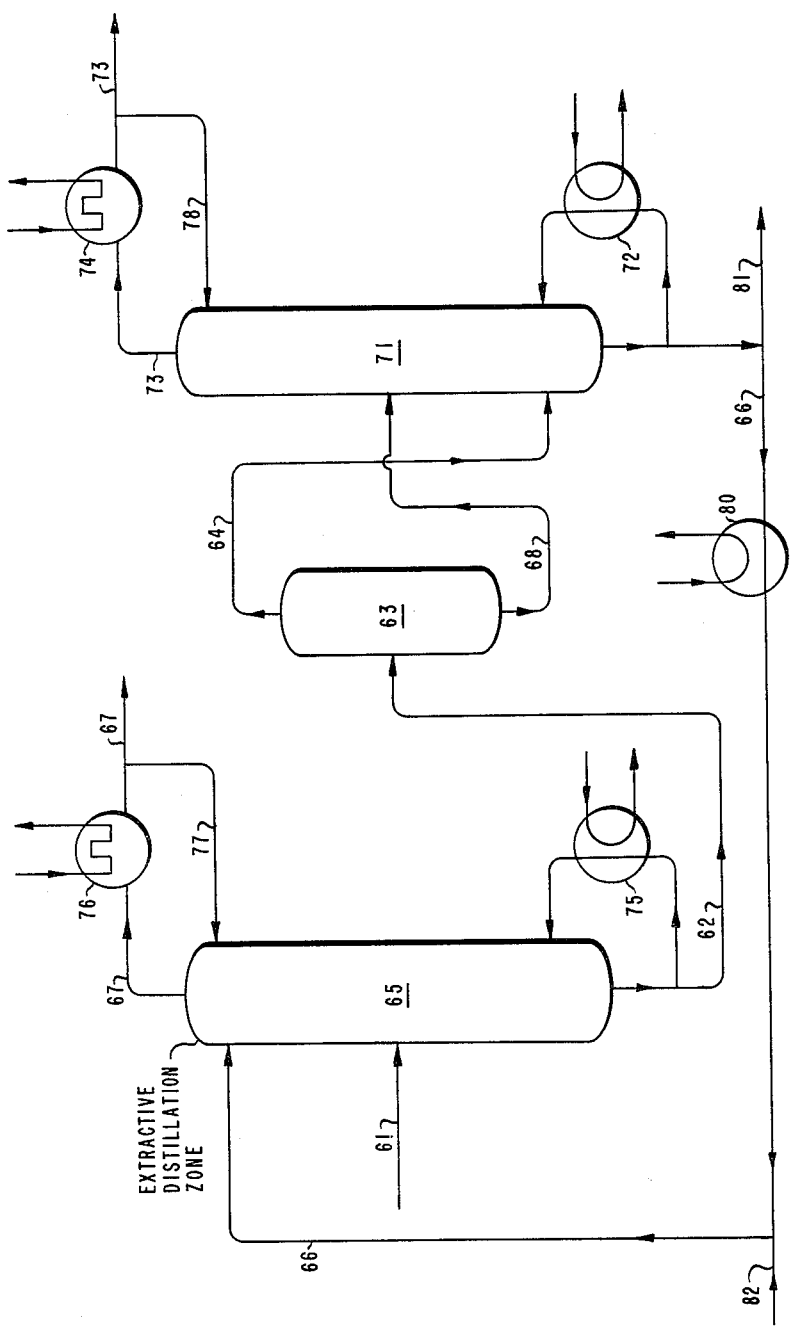
FIGURE III
INVENTORS:
WALTER C. G. KOSTERS
HEINZ VOETTER
BY: Jack L Foltz
THEIR ATTORNEY United States Patent Office 3,210,269
Patented Oct. 5, 1965

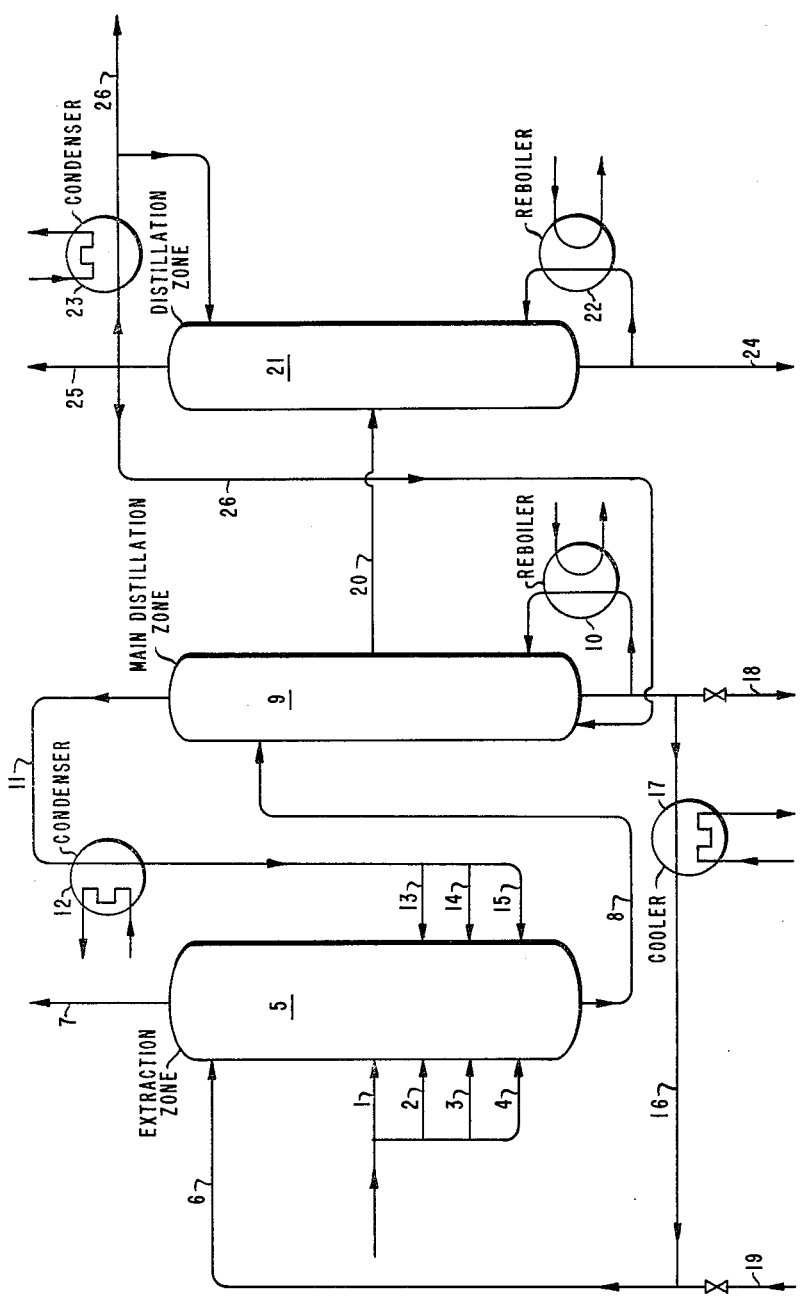

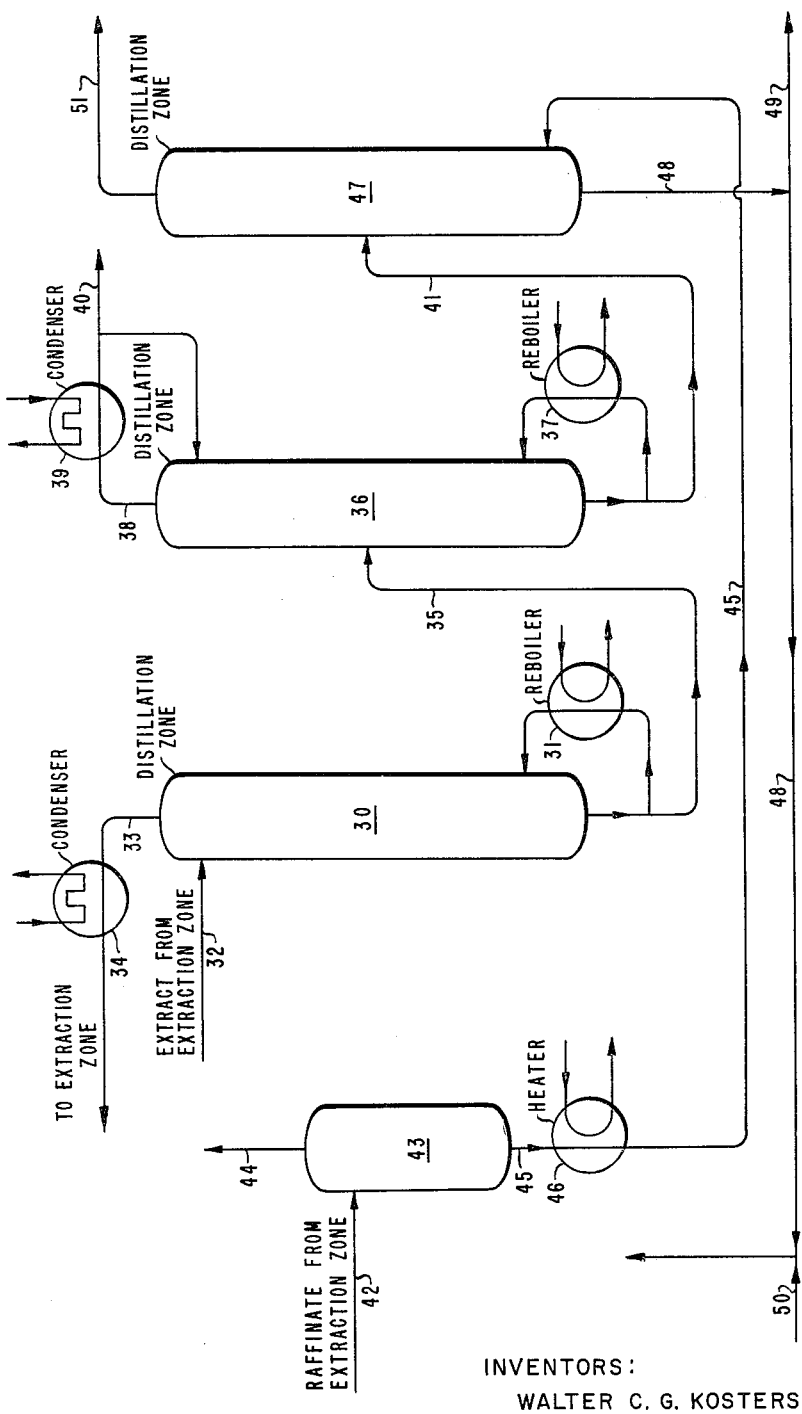

3,210,269
DRY SOLVENT EXTRACTION OF
HYDROCARBONS
Walter C. G. Kosters, The Hague, and Heinz Voetter,
Amsterdam, Netherlands, assignors to Shell Oil Company, New York, N.Y., a corporation of Delaware
Filed Mar. 12, 1962, Ser. No. 178,959
Claims priority, application Netherlands, Apr. 21, 1961,
263,865
11 Claims. (Cl. 208—321)

The invention relates to a process for the separation of a mixture by means of a selective solvent boiling higher than the mixture and in which one or more of the components of the mixture are more readily soluble and one or more other components are less readily soluble. More particularly, this invention relates to an improved extraction-stripping process wherein the material dissolved in the solvent is recovered by means of a distillation zone provide with a gaseous stripping medium comprising one or more of the components contained in the mixture to be separated.

In a conventional process, an extract phase containing the more readily soluble component is recovered by treating the starting mixture with a selective solvent and using a liquid-liquid extraction process. Subsequently, a steam-stripping step is used to recover from the extract phase as completely as possible those components originally present in the feed mixture which can only be removed from the solvent with great difficulty. The resultant solvent, therefore, which is substantially free from dissolved material will have an appreciable water content. Since the solvent will generally be recycled to the extraction zone, it is imperative that a solvent capable of containing significant amounts of water will have to be used in such a process in order to avoid measures, obviously involving great expense, for removing even the last traces of water from the solvent. However, the presence of water in many selective solvents results in a reduction of the dissolving power thereof which results in a less sharp separation or a more drastic mode of operation of the process, for example, the use of a very high ratio of solvent to the mixture to be separated, or the like. Further, there are often technical and economic reasons which forbid the use of a high temperature and/or a high vacuum in the recovery of the dissolved components (which would be required for operating without a stripping medium) and there considerations equally apply to the use of other stripping media such as nitrogen which are actually employed in the art. Omission of the stripping operation would result in loss of frequently valuable components in the solvent. Moreover, if the solvent is directly recycled without stripping, a less sharp separation of the starting mixture results since the solvent is improperly freed from the dissolved components resulting in quantities of the more readily soluble components passing overhead in the raffinate phase.

It is an object of this invention to provide an improved process for the separation of mixtures by an improved extraction-stripping process. It is a further object of this invention to provide an improved extraction-stripping process wherein the more readily soluble component in the solvent is effectively stripped therefrom without contaminating the solvent with steam, water and the like. Another object of the invention is to provide an improved extraction-stripping process wherein a dry selective solvent can be used. It is another object of this invention to provide an improved extraction-stripping processing utilizing a sulfolane type solvent for the high recovery of pure aromatics in high yields. It is a further object of this invention to provide a process for the recovery of substantially all of the aromatic components of a hydrocarbon mixture in highly purified form. Other objects and advantages of this invention will become apparent in the description thereof which is made with reference to the accompanying drawings which consist of three figures which are schematic diagrams of a preferred embodiment of the process.

Accordingly, it has now been found that the above objects can be achieved by using as a stripping medium in an extraction-stripping process one or more of the components contained in the feed mixture to be separated, that is, components which are either more or less readily soluble in the solvent.

According to the instant invention the stripping medium used is a material consisting at least substantially of one or more components which are present in the mixture to be separated and are almost equally soluble in the selective solvent.

Further, the stripping medium used according to the instant invention may be suitably employed as part of a distillation process which in itself, i.e., without an additional stripping operation, is suitable for the recovery of dissolved material from the solvent. As a result of the stripping operation being incorporated in the distillation process, the instant process is suitable for recovering materials which cannot normally be recovered by distillation alone.

However, since, unlike conventional stripping operations, the stripping operation of the invention is not effected with a "foreign" medium, it is preferable to carry out separately the "normal" distillation treatment and the stripping operation of the invention. This can be effected by carrying out the stripping operation after the dissolved components have already been substantially removed from the solvent by distillation.

If less readily soluble components are used as the stripping medium, the stripping medium and the material stripped from the solvent by means of the stripping medium are preferably recycled to the extraction zone where the starting material is treated with the selective solvent. In this manner the stripping material can be added to this system either together with the feed mixture to be separated or separately.

The removal by distillation as such, of dissolved material from the solvent (i.e., without regard to the nature of the stripping medium used) may be carried out in a known manner. If the mixture to be separated is treated with the solvent, using liquid-liquid extraction, this removal may be effected, for example, with the aid of one or two main distillation columns, as described in the U.K. patent specification 717,725 and the U.K. patent specification 739,200. When a 2-column system is used, the pressure in the second column is generally below the atmospheric pressure and the stripping operation is suitably carried out either in the said second main column (as in the prior art) or entirely separately, as indicated above. When extractive distillation is employed for the separation of the starting mixture, a single main column, if desired in addition to a separate stripping zone, is generally sufficient for freeing the solvent.

The distillation equipment used (extractive, main and other distillation columns) is preferably provided with valve trays, as described, for example, in the Belgian patent specification No. 591,929, or with trays fitted with one or more preferential discharge zones, as known, for example, from the U.K. patent specification No. 764,650.

When use is made of liquid-liquid extraction and of a distillation system of the type referred to, the operating pressure in the (first) distillation column is generally below that prevailing in the extraction system, which latter pressure should be sufficiently high to ensure that only material in the liquid phase is present in this system (with the possible exception of a quantity of inert gas occasionally employed in extraction treatments). Depending on the distillation system selected, the difference between the said two pressures may or may not be such that there is appreciable flash vaporization in the (first) column. If flash vaporization is undesirable, the weight ratio of the vaporous material present in the extract phase when the latter is introduced into the (first) distillation column to the fresh feedstock supplied to the treating system for the starting material, should preferably be lower than 1:10, and more preferably even be lower than 5:100, vaporous material being entirely absent in a particularly preferred embodiment.

Since the stripping medium should consist of components also occurring in the starting mixture, use may be made of a stripping medium originating from the actual mixture which is to be separated. In this case the stripping medium may consist of a group (or a portion thereof) of components derived from the mixture to be separated, all of which have about the same solubility, in the form in which this group was recovered. In the case of a group of more readily soluble components, this means in the form in which it was recovered from the solvent, and in the case of a group of less readily soluble components, in the form in which it was recovered either from the solvent or obtained from the extraction system as raffinate. This usually means that the stripping medium contains components of different volatility. But it is often advantageous to divide a material containing components derived from the mixture to be separated and having approximately the same solubility into two or more fractions of different volatility, and to use at least a portion of one of these fractions as stripping medium. This procedure makes it possible for the stripping medium to be extensively adapted to the conditions prevailing during the stripping operation.

In this case it is advantageous to use a light or relatively light fraction when the stripping medium should consist of more readily soluble components, but when a stripping medium is desired which consists of less readily soluble components, a heavy or relatively heavy fraction is advantageously selected. This is because the components which can only be removed with great difficulty are generally the less volatile of the more readily soluble components, so that the use of the more volatile portion produces the greatest effect when stripping is carried out with material which is likewise more readily soluble. Stripping with less soluble components was, however, found to produce a more favorable effect when material having a fairly low volatility was employed.

The said division into more volatile and less volatile fractions may be effected after recovery from the solvent of a group of components to be divided (either more or less readily soluble components). In this case such a group may be subjected to partial evaporation, for example, by heating and/or sudden reduction in pressure, to fractional distillation, to partial or fractional condensation, to flash distillation, or the like. (If the fraction to be used as stripping medium is thus obtained in the liquid state, it should, of course, be subsequently re-evaporated in order to be suitable for use as such.) If it is desired to use a volatile fraction consisting of more readily soluble components, it may, however, also be suitably prepared by subjecting to partial evaporation the solvent having a charge of more readily soluble components, but little or no charge of less readily soluble components, in which case the resultant vapor constitutes the stripping medium to be employed. Such a solvent which is only at least substantially charged with more readily soluble components may be suitably obtained as bottom product from the extractive distillation column when extractive distillation is used and when extraction is used by removing the less readily soluble components from the solvent in the form in which it leaves the extraction system. With the use of a distillation system with two main columns, as known from the above-mentioned U.K. patent specification No. 739,200, the solvent charged with components of only one type may suitably be the bottom product of the first main column (in which case the resultant vapor is introduced as stripping medium into the second main column and the remaining liquid is supplied as feedstock to this column).

The said partial evaporation may be effected by means of heating, sudden pressure reduction, or a combination of both, or else with the use of distillation, preferably flash distillation.

In principle, a wide variety of selective solvents may be used in the process of the invention, for example, furfural, phenol, acetonitrile, a solvent of the glycol type such as diethylene or dipropylene glycol, and the like.

The present process is particularly useful when the selective solvent is a solvent, preferably a dry solvent, of the sulfolane type. By a solvent of the sulfolane type is meant a solvent at least substantially consisting of sulfolane itself and/or one or more sulfolane derivatives, such as disclosed in U.K. patent specification 625,505. A solvent of this type preferably contains the lowest possible quantity of water, since excessive water content may adversely affect the solvent power of the solvent. But in practice it is often difficult to avoid some water contamination of the solvent. For example, it is often advantageous to introduce steam into the bottom of the distillation column to strip dissolved hydrocarbon from the solvent, as a result of which the distillation zone bottoms product consisting substantially of solvent will also contain some water. This water-containing bottoms product, optionally made up with fresh solvent, is generally re-used in the instant process (as shown in U.K. patent specification No. 717,725).

The sulfolane solvents which can be used according to this invention should preferably be selective to aromatics. Further, the solvent must be stable at the extraction and distillation temperatures maintained in the extraction and distillation zones. That is, the solvent must be sufficiently heat-stable so that it may at least partially vaporize without decomposition in the presence of the components of the mixture.

The sulfolane solvents of the invention may be made by condensing a conjugated diolefin with sulfur dioxide and then subjecting the resulting product to hydrogenation, alkylation, hydration and/or other substitution or addition reactions. A 2-sulfolene may be made similarly by isomerizing instead of by hydrogenating the product resulting from condensing a conjugated diolefin with sulfur dioxide. Unsubstituted sulfolane, the preferred sulfolane solvent in the process of the invention, has the formula:

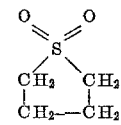

and 2-sulfolene has the formula:

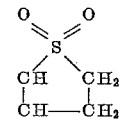

Other solvents which have high selectivity for separating aromatics from non-aromatic hydrocarbons are: 2-methylsulfolane, 2,4-dimethylsulfolane, 2,4-dimethyl-4-sulfolane, methyl 3-sulfolanyl ether, ethyl-3-sulfolanyl sulfide, methyl-aryl-3-sulfolanyl ether, n-aryl-3-sulfolanyl amine, 3-sulfolanyl acetate, and others.

The present process can be applied to numerou feed stocks having various boiling ranges wherein the component groups to be separated may be, for example, paraffinic and non-paraffinic (i.e., olefinic), aromatic and non-aromatic, heavy and light aromatic, paraffinic or other hydrocarbons, and also various non-hydrocarbons such as alcohols and esters. The instant process is especially suitable for the recovery of (1) aromatics from catalytically reformed gasoline fractions, such as hydroformates and platformates, (2) fractions of gasoline obtained as by-products in the preparation of lower olefins by severe thermal cracking, with or without the use of steam, (3) hydrocarbon materials, as described in the Belgian patent specification No. 596,748, and (4) fractions of light hydrocarbon oils obtained as by-products in the preparation of coke from coal. A refining treatment, preferably a hydrogenative refining treatment, is suitably applied to such by-products to reduce the olefin content before they are subjected to the instant process.

To insure that the solvent actually boils higher than the mixture to be separated, it is in most cases desirable for the latter to have an ASTM final boiling point of not higher than 220° C. Preferably the upper cuting point should not be higher than 160° C. When using a reformate fraction as a starting material, the upper cutting point should advantageously be approximately the same as the upper distillation cutting point of the feedstock for the reforming operation. The lower cutting point of the feedstock should preferably be about 65° C.

The starting mixture may be treated in a known manner to produce the extract phase (liquid-liquid extraction or extractive distillation). If extractive distillation is used it is preferably also carried out in a column provided with valve trays, or trays with preferential discharge (as referred to above) although a column provided with other contact material (for instance packing units, sieve trays or grid trays, bubble cap trays, and the like) may also be employed.

If a liquid-liquid extraction process is used, it should preferably be carried out in a countercurrent multi-stage extraction zone (the number of theoretical stages being preferably at least 5), for instance an extraction column containing packing material or sieve plates, or a multiplicity of mixer-settler combinations. A rotating disc contactor as described in the U.S. Patent 2,601,674, of June 24, 1952, to Reman is particularly preferred.

The feed to be separated may be introduced at an intermediate point into the multi-stage extraction zone but it is generally preferred to introduce the feed at or near that end of the extraction zone from which the extract phase is withdrawn. In this manner, the most efficient compromise between product purity and product recovery is usually realized. Suitable inlet points in the extraction zone are at the first theoretical stage or at the second theoretical stage, with the latter being preferred because the purity is distinctly higher while the recovery is only slightly decreased. Feed introduction at a plurality of points in the extraction zone may be useful under specific circumstances.

If the stream obtained as a top product from the distillation zone is returned, after condensation, to the extraction zone, it may also be suitably introduced at one or more points at or near the end of the (multi-stage) extraction zone from which the extract phase is withdrawn. Preferably, the distillation product is recycled to the first or second theoretical stage in the extraction zone in order to achieve the best compromise between product purity and recovery. If necessary, the recycle stream may be heated before entering the extraction zone.

When carrying out the process according to the invention, the amount of the solvent employed should be at least sufficient to dissolve the contituent to be extracted. In some cases a considerable excess over this amount may be used especially when it is desired to extract the last traces of the more soluble aromatic constituents from the feed. The most economical amount varies with the nature of the particular solvent involved, the temperatures and pressures employed, and the particular feed mixture to be extracted. This amount can be determined experimentally. Useful solvent-to-feed ratios in the extraction zone may range from between about 1:1 to about 6:1 and preferably between about 2:1 and 3:1 (for example, with the use of a sulfolane solvent), a slightly higher ratio is required, viz, between about 4:1 and about 12:1, preferably between about 6:1 and about 9:1 with the use of a solvent of the glycol type. If the top product from the distillation zone is returned to an extraction zone the ratio of the quantity of this top product to fresh feed is suitably between about 0.1:1 and about 0.7:1, preferably between about 0.4:1 and about 0.5:1.

If the whole or part of the fraction obtained as bottom product from the distillation zone is to be re-used as selective solvent in the extraction zone, this fraction or the relevant part thereof is preferably first cooled. Cooling is particularly useful when a solvent of the sulfolane type is employed, the cooling taking place until a difference in temperature before and after cooling is obtained of about 10 to 120° C. and preferably of about 40° C. to about 80° C.

When using a liquid-liquid extraction zone, the distillation zone is generally operated at a pressure which is lower than that prevailing in the extraction zone. The latter pressure should be sufficiently high to insure that only material in the liquid phase is present in this system (with the possible exception of a quantity of inert gas which is sometimes used in an extraction treatment); as stated above, the difference between the two pressures should, however, not be such as to cause appreciable flash vaporization.

The invention will be further illustrated with reference to the accompanying drawings. The apparatus employed in this process may be any conventional or convenient type known to those skilled in the art. For simplicity, the drawings do not show all the pumps, tanks, heat exchangers, valves, bypasses, vents, reboilers, condensers, coolers, and other auxiliaries that may be necessary for the proper operation of the process, but the inclusion of which will be evident to those skilled in the art.

FIGURE I of the drawing shows an embodiment of the process of the invention, using liquid-liquid extraction by means of sulfolane for treating the starting mixture, one main distillation column for freeing the solvent from components dissolved therein, and more readily soluble components as stripping medium.

The mixture to be separated, containing aromatic and non-aromatic hydrocarbons, is introduced through one or more lines 1 through 4 into extraction zone 5. Extraction zone 5 is preferably a rotating disc multi-stage extractor. The mixture then countercurrently contacts a liquid sulfolane selective solvent, introduced into the opposite end of extraction zone 5 through line 6. The extraction zone is operated at a pressure of about 6 atm. absolute and a temperature of about 100° C.

A raffinate phase, containing the non-aromatic hydrocarbons and relatively small quantities of solvent and aromatic hydrocarbons, is removed from the top of extraction zones 5 through line 7. The raffinate can further be treated to remove the solvent present therein, for example, by means of water-washing (not shown).

An aromatic-rich extract phase is withdrawn from the bottom of extraction zone 5 through line 8 and can be passed through a reducing valve (not shown) to distillation zone 9. The bottom and the top areas of distillation zone 9 are fitted with trays (not shown) which are provided with preferential discharge zones. The extract phase is introduced at or near the top of distillation zone 9 via line 8 to strip the dissolved hydrocarbons from the descending liquid. The pressure in the distillation zone 9 is at least about 1 atm. abs. but lower than the pressure in the extractor 5. Heat may be supplied to zone 9 in any suitable manner, for example, by means of reboiler 10. In the distillation zone separation is effected into a top product mainly consisting substantially of all the non-aromatic hydrocarbons present in the extract phase, and some water and a bottom product which contains very little water and which consists substantially of the selective solvent and the aromatic constituents of the extract phase. The top vapors from zone 9 have a temperature of about 100° C. and are passed through line 11 to condenser 12. The resultant condensate is re-introduced into the lower portion of extraction zone wholly or in part through lines 13, 14 and 15.

The bottom (solvent) product withdrawn from distillation zone 9 is returned to extraction zone 5 through line 16 after being cooled by about 70° C. in cooler 17. If desired, a slip stream of approximately 5 to 10% of the total solvent inventory can be passed to a solvent clean-up system (not shown) by means of valued line 18, with fresh or purified solvent being introduced into line 6 through valved line 19.

A side stream consisting at least substantially of aromatic hydrocarbons is removed in vapor form from the central part of zone 9 and is introduced into a distillation zone 21. (In the present case the whole of the side stream is introduced therein, but if desired only a part thereof is introduced, with the remainder being removed as aromatic product.) Heat is supplied to zone 21 by means of reboiler 22 and the reflux recycled from condenser 23. A bottom product consisting at least substantially of relatively heavy aromatic hydrocarbons is removed from distillation zone 21 through line 24. A portion of the overhead from zone 21, consisting at least substantially of relatively light aromatic hydrocarbons, may be removed through line 25 and/or, after condensation, through line 26. However, in either case at least a portion of these top vapors is introduced through line 27 into the lower part of the main distillation zone 9 as stripping medium to facilitate the removal of heavy aromatic hydrocarbons from the selective solvent present in this part of the zone.

Alternatively, a liquid side stream could be removed by means of line 20 and subjected to partial evaporation, for example, by means of heating and/or sudden pressure reduction, or subjected to distillation (with or without the use of flashing), and the resultant vapor used as stripping medium. But this methol has drawback that such a liquid side stream taken from the central part of zone 9 generally contains a considerably greater quantity of solvent than a vapor stream removed at approximately the same height. Although this has little or no effect on the composition of the stripping medium which substantially consists of light aromatics and is to be prepared by partial evaporation from this side-stream, the liquid product containing heavy aromatics obtained after this evaporation has, however, a lower degree of purity since it contains more solvent than if it has been produced from a vaporous side-stream. Hence it is preferable to remove a vaporous side-stream.

The stripping operation with the medium prepared in the manner indicated, which in the present case takes place in the main distillation zone, could, of course, be effected separately, as already stated above.

FIGURE II of the drawing shows an embodiment of the process of the invention in which use is made of two main distillation zones for freeing the solvent from components dissolved therein, of heavy, less readily soluble components as stripping medium, and of a separate stripping operation.

The mixture to be separated containing aromatic and non-aromatic hydrocarbons is first extracted with diethylene glycol as the selective solvent. The extraction step (not shown) is similar to that described above with reference to FIGURE I. Distillation zone 30 is the first of two main distillation columns, in which columns the diethylene glycol is freed from at least most of the substance dissolved therein. Zone 30 operates under a lower pressure than that prevailing in the extracting system. Heat is supplied thereto in a suitable manner, for example, by means of a reboiler 31. The extract phase supplied from an extraction zone through line 32 is introduced into the first main distillation zone 30, i.e., in the upper part thereof, without appreciable flash vaporization. This zone is operated without reflux. The extract phase is separated in zone 30 into a top product consisting substantially of the major portion of the non-aromatic hydrocarbons present in the extract phase, and in a bottom product which consists substantially of the diethylene glycol solvent with aromatic hydrocarbons dissolved therein, but is (substantially) free from non-aromatic hydrocarbons. The top vapors from the zone 30 are passed through line 33 to a condenser 34, with the condensate therefrom being recycled to the extraction zone (not shown). The bottom product of first main distillation zone 30 is led through line 35 into a second main distillation zone 36 operating at subatmospheric pressure, where the bottom product is separated into a top product consisting at least substantially of aromatic hydrocarbons (and is substantially free from diethylene glycol) and into a bottom product consisting substantially of diethylene glycol. Heat may be supplied to the zone 36 in any desired manner, for example, by means of a reboiler 37.

The top vapors from the column 36 are passed through a line 38 via a condenser 39, and the condensate is partly recycled as reflux to the column 36 and partly removed as aromatic-rich product through line 40. If desired, aromatic-rich product may also be removed in vapor form upstream of the condenser 39. The bottom product from the zone 36 is discharged through line 41.

According to the invention non-aromatic material from the extraction zone (in the present case all the material, although, if desired, only a part thereof) is passed by means of line 42 after heating, to a vessel 43 at lower pressure in which flash distillation occurs. Vapor is removed from this vessel through line 44 and discharged as a product substantially consisting of relatively light, non-aromatic hydrocarbons. Liquid substantially consisting of relatively heavy non-aromatic hydrocarbons is passed (at least partly) through line 45 to heater 46, where it is evaporated and subsequently introduced as stripping medium into the bottom part of the distillation zone 47, the diethylene glycol which is removed through line 41 from column 36 and still contains some heavy aromatic hydrocarbons being supplied to the top part of said distillation zone 47. These heavy aromatics are at least substantially removed by the stripping medium from the solvent in zone 47 (which in the present case operates without reflux and reboiling). The bottom product from zone 47, i.e., the diethylene glycol at least substantially freed from dissolved components, is returned to the extraction zone through line 48 (in the present case without first being cooled, since this is frequently unnecessary with the use of diethylene glycol as selective solvent). If desired a portion of the bottom product may be passed through line 49 for purification or rejection, while fresh or purified solvent may be supplied through line 50.

The top product from the column 47 containing heavy non-aromatic and aromatic hydrocarbons is recycled through line 51 to the extraction zone for re-separation. It may be recycled separately or combined with the feedstock at some suitable point.

The stripping medium may also be prepared by means of a single heating operation or by fractional distillation from the raffinate derived from the extraction zone, instead of by means of flash distillation. The said raffinate may sometimes advantageously be employed as a whole (i.e., without previous separation in fractions) or a light fraction thereof may be used instead of a heavy one. It is obviously also possible to use as stripping medium the top vapors from the first main distillation zone or a fraction prepared therefrom (for example, by means of distillation or fractional condensation) if desired, together with the vapor prepared (in the above manner) from the raffinate.

If an extractive distillation column were used as separating equipment from which the raffinate is not recovered in liquid form but as vapor, the flashing vessel 43 could be replaced, for example, by a cooler/gas-liquid separator combination. In this case also the resultant liquid could be used, after heating in the heater 46 as stripping medium in column 47.

FIGURE III of the drawing shows an embodiment of the process of the invention, using extractive distillation for treating the starting mixture, and light, more readily soluble components recovered from the solvent prior to the complete freeing of the solvent. In this case also a mixture containing aromatic and non-aromatic hydrocarbons is separated, and again by means of sulfolane as selective solvent.

The mixture to be separated is passed through line 61 into extractive distillation zone 65 provided with valve trays. Sulfolane is introduced through line 66. Heat may be supplied to zone 65 in any desired manner, for example, by means of reboiler 75. The top vapors from zone 65, which contain only a relatively small quantity of solvent and aromatic hydrocarbons, are passed from the top of zone 65 through a line 67 via a condenser 76 and the condensate is partly recycled as reflux to zone 65 by means of line 77 and partly discharged as a product poor in aromatics through line 67, and further treated to remove the solvent present therein (not shown). If desired this product may also be removed in vapor from upstream of condenser 76. The bottom product from zone 65, i.e., an aromatic-rich extract phase, which is at least substantially free from non-aromatics, is discharged through line 62.

According to the invention, the bottom product from zone 65 discharged through line 62 is not directly passed to a main distillation zone 71 in order to be worked up, but is first led (via a reducing valve not shown) to vessel 63 in which a lower pressure prevails than in zone 65.

Partial evaporation as a result of flash distillation takes place in vessel 63. The resultant vapor (at least substantially light aromatic hydrocarbons) is introduced through line 64 as stripping medium into the bottom of zone 71; the remaining liquid (at least substantially only sulfolane and heavier aromatic hydrocarbons) constitutes the feedstock for zone 71 (through line 68). If the quantity of heat supplied with the stripping medium in line 64 and with the liquid in line 68 is not sufficient, heat may be supplied to zone 71 in any desired manner, for example, by means of reboiler 72. Alternatively, the actual liquid and/or stripping medium may be heated for this purpose. The liquid supplied through line 68 is separated in zone 71 under the influence of the stripping medium into (substantially pure) sulfolane on the one hand and heavier aromatics on the other. The latter are discharged, together with light aromatics derived from the stripping medium, through line 73 and condenser 74, a portion thereof being used as reflux for zone 71 by means of line 78. If desired, aromatic-rich product may also be removed in vapor form upstream of the condenser 74. The bottom product of zone 71 is recycled through line 66 to zone 65. This recycled product is first cooled in cooler 80, which is generally advisable when sulfolane is used as solvent. If desired, solvent may be discharged through line 81 and/or supplied through line 82.

The pressure in vessel 63 preferably exceeds that prevailing in zone 71 to such an extent only that the materials supplied through lines 64 and 68 may be introduced into the zone without the use of pumps or compressors.

Instead of preparing by means of flash distillation the fraction to be used as stripping medium, it may be produced also, for example, by fractional distillation of the material supplied through line 62, but this is less attractive from the economic point of view.

The stripping operation with the stripping medium prepared by the present process may, of course, also be effected separately, for example, in the manner shown in FIGURE II. Use may also be made of a stripping medium prepared partly from material produced in the above-described manner, and partly by separation of aromatics already recovered from the solvent (in a manner similar to that shown in FIGURE I, although in connection with a different solvent working-up process).

The invention will now be further illustrated with reference to the following example.

*Example*

The following process was carried out in a process of the type shown in FIGURE II of the drawing and will be described with reference to said figure.

A starting mixture substantially consisting of hydrocarbons with 6 to 8 carbon atoms, of which 50 mole percent paraffins and 50 mole percent aromatics, i.e., 5 mole percent benzene, 35 mole percent toluene and 10 mole percent xylenes, was treated by means of a distillation process preceded by an extraction process wherein diethylene glycol was used as the selective solvent in a quantity of 6 mole per mole of feedstock. The bottom product from zone 36 (which operated at a pressure of 250 mm. Hg and a bottom temperature of 180° C.) consisted of 0.05 mole percent of benzene, 0.50 mole percent toluene, and 0.46 mole percent xylenes. When this bottom product was directly recycled (i.e., without after-treatment in zone 47) to the extraction zone (not shown), the raffinate discharged through line 42 from the extraction zone still consisted of up to 0.15 mole percent benzene, up to 2.2 mole percent toluene, and up to 3.0 mole percent xylenes. When, however, the bottom product from the column 36 was stripped in column 47 with 0.12 mole of heavy raffinate (substantially $C_7$ paraffins) supplied through line 45, per mole of feedstock for the extraction zone, the solvent was thereby freed from the said aromatics to such an extent that the content of these aromatics in the raffinate in line 42 was reduced to only 0.004 mole percent benzene, 0.028 mole percent toluene, and 1.2 mole percent xylenes. In this case the top product from zone 47 consisting of 65 mole percent paraffins, 1.8 mole percent benzene, 17.2 mole percent toluene, and 16 mole percent xylenes was recycled in a quantity of 0.17 mole per mole of feedstock for the extraction zone to this feedstock.

We claim as our invention:

1. In an extraction-stripping process for the separation of a liquid hydrocarbon mixture having a lower cutting point of about 65° C. by means of a selective solvent boiling higher than the mixture, wherein at least one component of the mixture is more readily soluble in the solvent and at least one other component is less readily soluble in the solvent and wherein an extract phase containing the solvent is recovered from an extraction zone and is passed into a stripping zone, the improvement comprising:

(1) using a dry selective solvent in the extraction zone,
   (2) distilling the fat selective solvent withdrawn as the extract phase from the extraction zone, said distilled solvent containing the more readily soluble components of the feed,
   (3) introducing the distilled solvent into a stripping zone and using as the stripping medium in said stripping zone a material consisting substantially of one of the components of the feed which has been separated therefrom by extraction with said selective solvent, and
   (4) recycling the mixture of the stripping medium and the material stripped from the solvent to the extraction zone.

2. A process according to claim 1 wherein the selective solvent used is a sulfolane solvent.

3. A process according to claim 1 wherein the mixture to be separated is a catalytically reformed gasoline.

4. A process according to claim 1 wherein the mixture to be separated is a refined gasoline, obtained as by-product in the preparation of olefins by means of severe thermal cracking.

5. A process according to claim 1 wherein the mixture to be separated is a refined light hydrocarbon oil.

6. A process according to claim 1 wherein a material containing components which are derived from the feed mixture to be separated and having essentially the same solubility is divided into at least two fractions of different volatility with at least a portion of one of said fractions being used as the stripping medium.

7. A process according to claim 1 wherein the stripping medium consists at least substantially of a heavy fraction of the less readily soluble components of the feed.

8. A process according to claim 1 wherein the stripping medium consists at least substantially of a light fraction of the more readily soluble components of the feed.

9. A process according to claim 1 wherein the solvent containing the more readily soluble components and being essentially free from the less readily soluble components is subjected to partial evaporation, with the resultant vapor being used as the stripping medium.

10. A process according to claim 2 wherein the sulfolane solvent is sulfolane.

11. A process according to claim 1 wherein the mixture of stripping medium and material stripped from the solvent is cooled by about 40 to about 80° C. prior to introduction into the extraction zone.

References Cited by the Examiner
UNITED STATES PATENTS

| | | | |
|---|---|---|---|
| 2,656,301 | 10/53 | Findlay | 208—313 |
| 3,065,167 | 11/62 | Zuiderweg et al. | 208—325 |

DELBERT E. GANTZ, *Primary Examiner.*

ALPHONSO D. SULLIVAN, *Examiner.*